United States Patent
Wu et al.

(10) Patent No.: US 10,379,266 B2
(45) Date of Patent: Aug. 13, 2019

(54) NEAR-EYE DISPLAY DEVICE

(71) Applicant: Sung-Yang Wu, Hsinchu (TW)

(72) Inventors: Sung-Yang Wu, Hsinchu (TW);
Wei-Min Cheng, Taoyuan (TW)

(73) Assignee: Sung-Yang Wu, Hsinchu (TW)

( * ) Notice: Subject to any disclaimer, the term of this patent is extended or adjusted under 35 U.S.C. 154(b) by 0 days.

(21) Appl. No.: 15/705,281

(22) Filed: Sep. 15, 2017

(65) Prior Publication Data

US 2019/0086584 A1     Mar. 21, 2019

(51) Int. Cl.
| | | |
|---|---|---|
| *G02B 9/00* | (2006.01) | |
| *G02B 9/08* | (2006.01) | |
| *G02B 5/00* | (2006.01) | |
| *G02B 3/00* | (2006.01) | |

(52) U.S. Cl.
CPC ........... *G02B 5/005* (2013.01); *G02B 3/0056* (2013.01)

(58) Field of Classification Search
CPC ... H01L 33/58; F21V 3/00; F21V 5/04; F21V 5/045; F21V 7/04; G02B 27/0172; G02B 27/0081; G02B 17/0868; G02B 19/0061; G02B 23/125; G02B 27/0922; G02B 27/0961; G02B 3/0037; G02B 3/0056
See application file for complete search history.

(56) References Cited

U.S. PATENT DOCUMENTS

| | | | | |
|---|---|---|---|---|
| 5,124,818 | A | * | 6/1992 | Conner ............... G02F 1/13471 349/122 |
| 6,057,966 | A | * | 5/2000 | Carroll ............... G02B 27/0172 345/8 |
| 6,104,446 | A | * | 8/2000 | Blankenbecler .. G02F 1/133621 349/5 |
| 2003/0103190 | A1 | | 6/2003 | Ando |
| 2013/0285885 | A1 | | 10/2013 | Nowatzyk |
| 2014/0043320 | A1 | * | 2/2014 | Tosaya ............... G02B 27/0172 345/419 |
| 2014/0168783 | A1 | | 6/2014 | Luebke |

FOREIGN PATENT DOCUMENTS

| | | |
|---|---|---|
| CN | 106019599 | 10/2016 |
| TW | 594054 | 6/2004 |
| TW | I490545 | 7/2015 |
| TW | I554784 | 10/2016 |
| WO | 2016064773 | 4/2016 |

* cited by examiner

*Primary Examiner* — Alicia M Harrington
(74) *Attorney, Agent, or Firm* — Winston Hsu

(57) ABSTRACT

A near-eye display device includes a display panel and a plurality of light modulation units. The display panel includes a plurality of display pixel units configured to emit display light. The light modulation units are disposed on a light emitting surface of the display panel, and each of the light modulation units is disposed corresponding to one of the display pixel units. Each of the light modulation units is configured to direct the display light emitted from the corresponding display pixel unit to an eye of a user, and a width of the display light directed to the eye of the user is smaller than the pupil size of the eye. The user may still receive clear images when the near-eye display is out of focus because the display light directed to the eye has the width smaller than the pupil size.

7 Claims, 5 Drawing Sheets

NEAR-EYE DISPLAY DEVICE

BACKGROUND OF THE INVENTION

1. Field of the Invention

The present invention relates to a near-eye display device, and more particularly, to a near-eye display device including light modulation units configured to direct display light to an eye of a user.

2. Description of the Prior Art

As virtual reality (VR) and the related applications are getting more and more popular, the virtual reality equipment such as near-eye display devices and head-mounted display devices are developed rapidly. The user using the virtual reality equipment may be able to "look around" the artificial world and interact with virtual features or items. However, it might cause nausea to some users after using the virtual reality equipment because the eye has to focus on dynamic images, and the experience of the user may be affected accordingly.

SUMMARY OF THE INVENTION

A near-eye display device is provided in the present invention. Each light modulation unit in the near-eye display device is disposed are corresponding to one display pixel unit and configured to direct display light emitted from the display pixel unit to an eye of a user and make the width of the display light directed to the eye smaller than the pupil size of the eye. Therefore, the user may still receive clear images from the near-eye display device when the user focuses on the wrong distance, and the user will not suffer from problems cause by variations of the distance between the user and the near-eye display device and the parallax between two eyes of the user. It may help to relieve the tension in the eyes of the user using the near-eye display device, and the user experience of the near-eye display device may be enhanced accordingly.

According to an embodiment of the present invention, a near-eye display device is provided. The near-eye display device includes a display panel and a plurality of light modulation units. The display panel includes a plurality of display pixel units configured to emit display light. The light modulation units are disposed on a light emitting surface of the display panel, and each of the light modulation units is disposed corresponding to one of the display pixel units. Each of the light modulation units is configured to direct the display light emitted from the corresponding display pixel unit to an eye of a user, and a width of the display light directed to the eye of the user is smaller than the pupil size of the eye.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
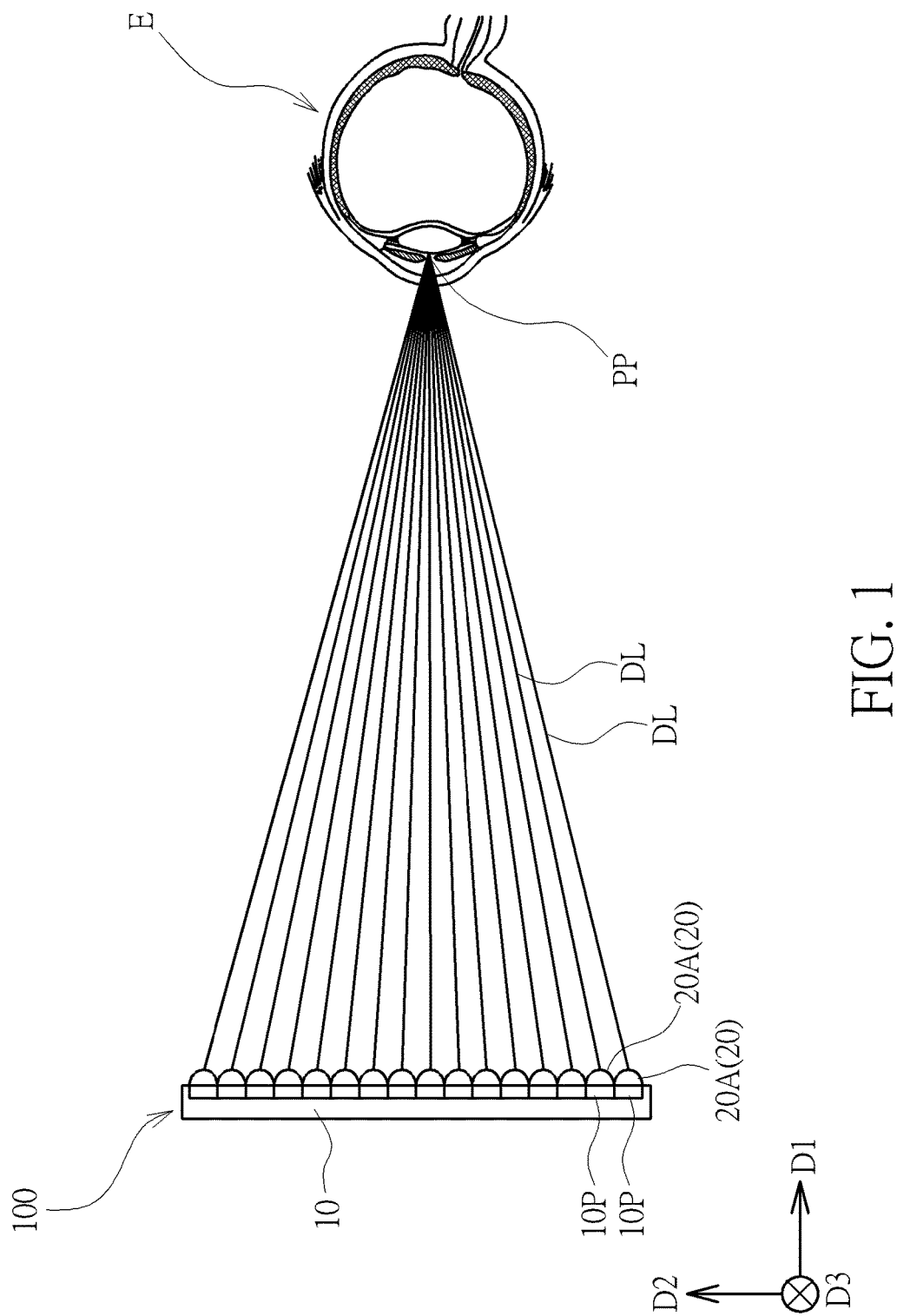
FIG. 1 is a schematic drawing illustrating a near-eye display device according to a first embodiment of the present invention.

In the following detailed description of the invention, reference is made to the accompanying drawings, which form a part hereof, and in which is shown, by way of illustration, specific embodiments in which the invention may be practiced. These embodiments are described in sufficient detail to enable those skilled in the art to practice the invention. Other embodiments may be utilized and structural changes may be made without departing from the scope of the present invention.

The following detailed description is, therefore, not to be taken in a limiting sense, and the scope of the present invention is defined only by the appended claims, along with the full scope of equivalents to which such claims are entitled. One or more implementations of the present invention will now be described with reference to the attached drawings, wherein like reference numerals are used to refer to like elements throughout, and wherein the illustrated structures are not necessarily drawn to scale.

Figure 2:
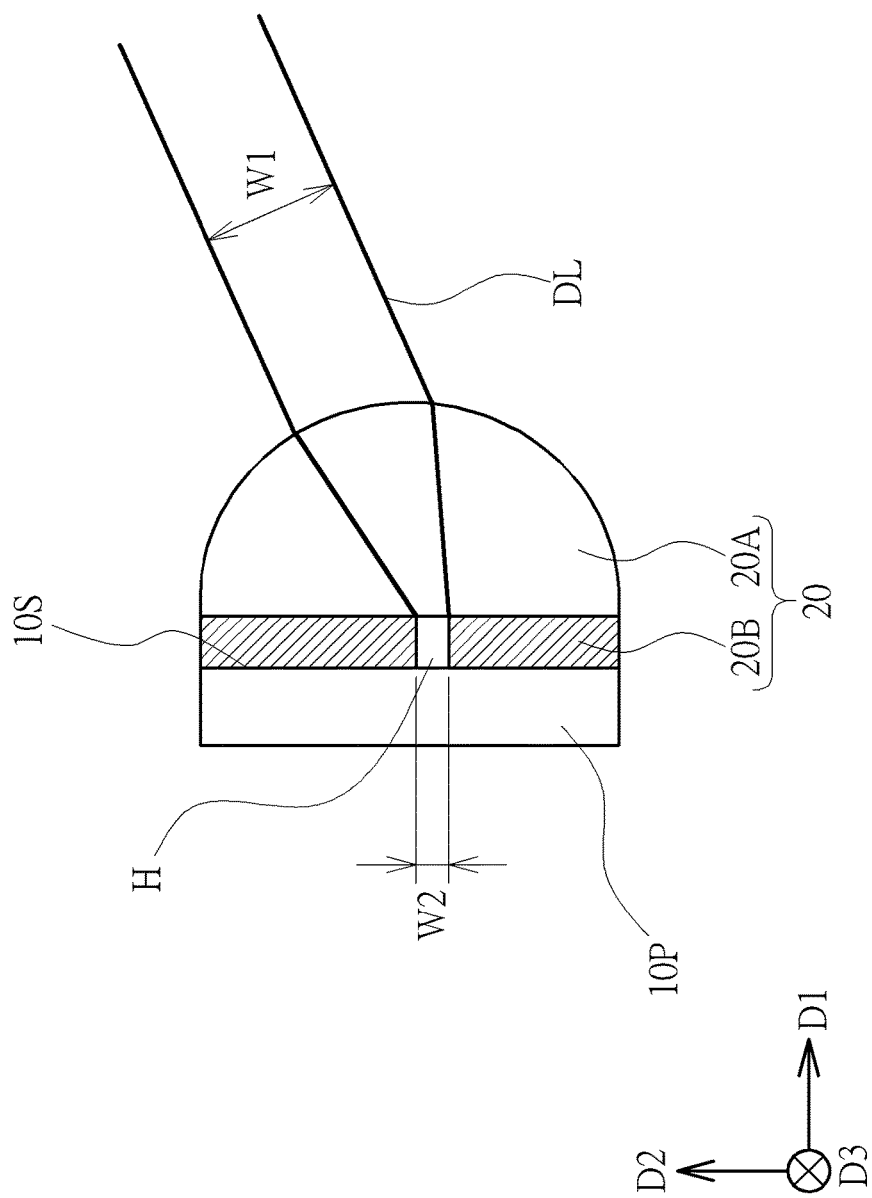
FIG. 2 is a schematic drawing illustrating one display pixel unit and a corresponding light modulation unit of the near-eye display device according to the first embodiment of the present invention.
Figure 3:
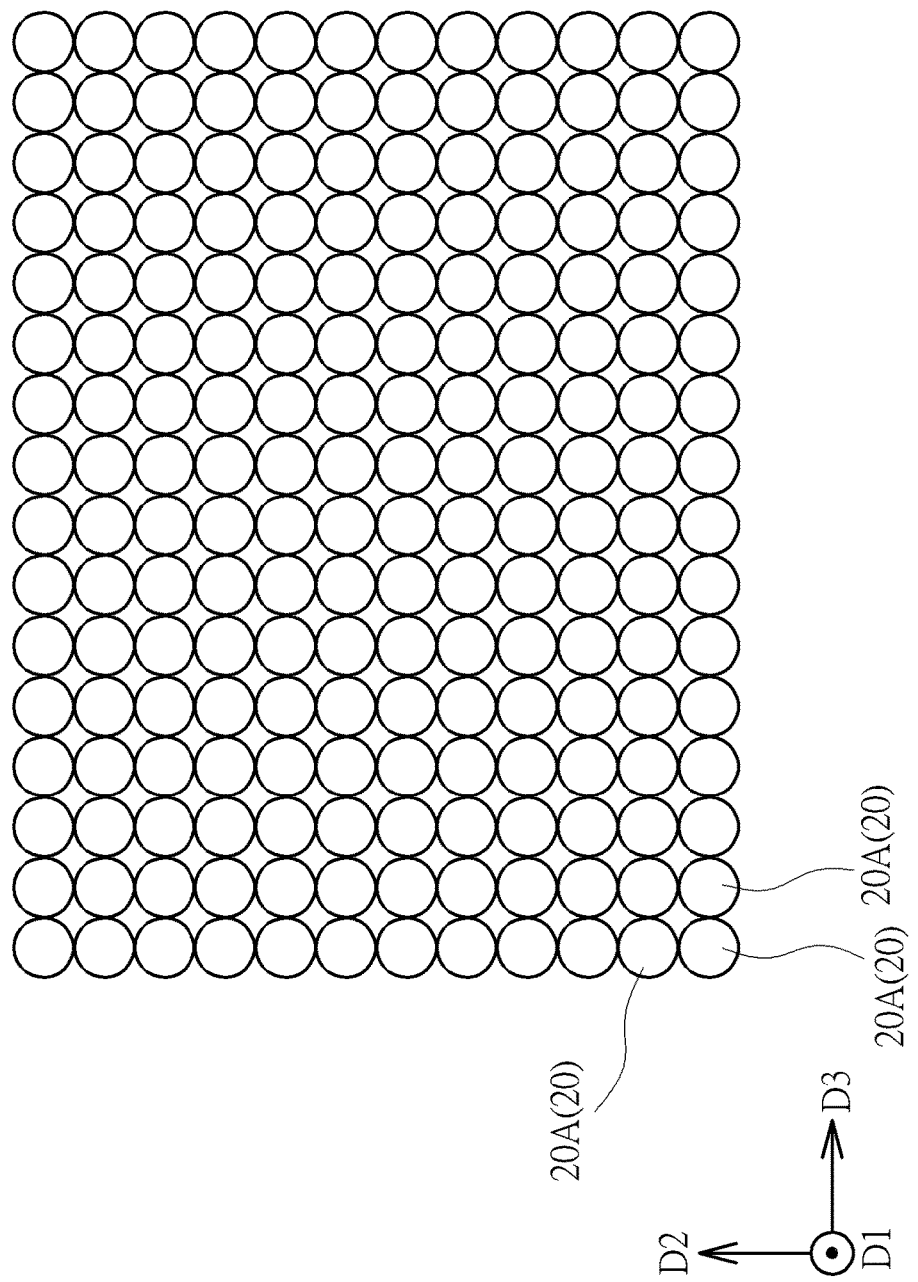
FIG. 3 is a schematic drawing illustrating an arrangement of the light modulation units in the near-eye display device according to the first embodiment of the present invention.

Please refer to FIG. 1, FIG. 2, and FIG. 3. FIG. 1 is a schematic drawing illustrating a near-eye display device according to a first embodiment of the present invention. FIG. 2 is a schematic drawing illustrating one display pixel unit and a corresponding light modulation unit of the near-eye display device in this embodiment. FIG. 3 is a schematic drawing illustrating an arrangement of the light modulation units in the near-eye display device of this embodiment. As shown in FIG. 1 and FIG. 2, a near-eye display device 100 is provided. The near-eye display device 100 includes a display panel 10 and a plurality of light modulation units 20. The display panel 10 includes a plurality of display pixel units 10P configured to emit display light DL. The display panel 10 may include a liquid crystal display (LCD) panel, an organic light emitting diode (OLED), a micro-LED display panel, a projective type display panel, or other suitable types of display panels. In some embodiments, each of the display pixel units 10P may be a sub pixel emitting one of the primary colors, such as red, green, and blue, but not limited thereto. In some embodiments, each of the display pixel units 10P may also be a pixel emitting the display light DL by color mixing. The light modulation units 20 are disposed on a light emitting surface 10S of the display panel 10, and each of the light modulation units 20 is disposed corresponding to one of the display pixel units 10P. In other words, each of the light modulation units 20 is disposed corresponding to only one of the display pixel units 10P in a first direction D1, and each of the display units 10P is disposed corresponding to only one of the light modulation units 20 in the first direction D1. The first direction D1 may be a direction perpendicular to the light emitting surface 10S of the display panel 10, and the first direction D1 may be a thickness direction of the display panel 10, but not limited thereto.

Each of the light modulation units 20 is configured to direct the display light DL emitted from the corresponding display pixel unit 10P to an eye E of a user, and a width (such as a first width shown in FIG. 2) of the display light DL directed to the eye E of the user is smaller than the pupil size of the eye E. Generally, the size of the pupil PP in the human eye ranges between 1.5 millimeters (mm) and 5.0 mm. Therefore, the first width W1 of the display light DL directed to the eye E of the user is smaller than 1.5 mm. In some embodiments, the first width W1 of the display light DL directed to the eye E of the user may be smaller than 1 mm, but not limited thereto. The display light DL emitted from each of the display pixel units 10P of the display panel 10 may be directly directed to one eye E of the user, and the user may still receive clear images from the near-eye display device 100 when the user focuses on the wrong distance because the first width W1 of the display light DL directed to the eye E is smaller than the pupil size of the eye E and the display light DL may directly project on the retina of the eye E by the pinhole effect. Therefore, the user will not have to focus on a specific distance for clearly seeing the images generated by the display panel 10, and the user will not suffer from problems cause by variations of the distance between the user and the near-eye display device 100. In some embodiments, a part of the light modulation units 20 may be configured to direct the display light DL to one eye E of the user (such as the right eye of the user) and another part of the light modulation units 20 may be configured to direct the display light DL to the other eye E of the user (such as the left eye of the user), and the display light DL may be modified for generating a 3D effect for the user, but not limited thereto. The user will not suffer from the parallax between two eyes of the user because each eye of the user does not have to focus on a specific distance for clearly seeing the images generated by the display panel 10. The design of the near-eye display device in the present invention may help to relieve the tension in the eyes of the user using the near-eye display device, and the user experience of the near-eye display device may be enhanced accordingly.

As shown in FIG. 1 and FIG. 2, in some embodiments, each of the light modulation units 20 may include a microlens 20A configured to direct the display light DL to the eye E of the user. An emitting angle of the display light DL directed by one of the light modulation units 20 may be different from an emitting angle of the display light DL directed by another one of the light modulation units 20. In some embodiments, at least two of the microlenses 20A may direct the display light DL in different directions. For example, an incident direction of the display light DL directed by one of the microlenses 20A may be different form an incident direction of the display light DL directed by another one of the microlenses 20A. The incident direction of the display light DL directed by some of the microlenses 20A may be parallel with the first direction D1, and the incident direction of the display light DL directed by some of the microlenses 20A may be not parallel with the first direction D1. Each of the microlenses 20A may include a Fresnel lens, a lenticular lens, or other suitable types of microlenses. In some embodiments, each of the light modulation units 20 may further include a light shielding layer 20B having a pinhole H, and the light shielding layer 20B is disposed between the light emitting surface 10S of the display panel 10 and the microlens 20A. The display light DL emitted from each of the display pixel units 10P may pass through the corresponding pinhole H, and a width (such as a second width W2 shown in FIG. 2) of each of the pinholes H is smaller than the pupil size of the eye E for constraining the width of the display light DL entering the corresponding microlens 20A. Therefore, the second width W2 of each of the pinholes H is smaller than 1.5 mm. In some embodiments, the second width W2 of each of the pinholes H may be smaller than 1 mm, but not limited thereto. In addition, the first width W1 of the display light DL directed to the eye E of the user may be larger than the second width W2 of each of the pinholes H.

As shown in FIG. 1, FIG. 2, and FIG. 3, the light modulation units 20 may be arranged in an array configuration in a second direction D2 and a third direction D3. The second direction D2 and the third direction D3 may be orthogonal to the first direction D1, but not limited thereto. The allocation of the light modulation units 20 is not limited to the condition shown in FIG. 3 and may be modified in accordance with the arrangement of the display pixel units 10P.

The following description will detail the different embodiments of the present invention. To simplify the description, identical components in each of the following embodiments are marked with identical symbols. For making it easier to understand the differences between the embodiments, the following description will detail the dissimilarities among different embodiments and the identical features will not be redundantly described.

Figure 4:
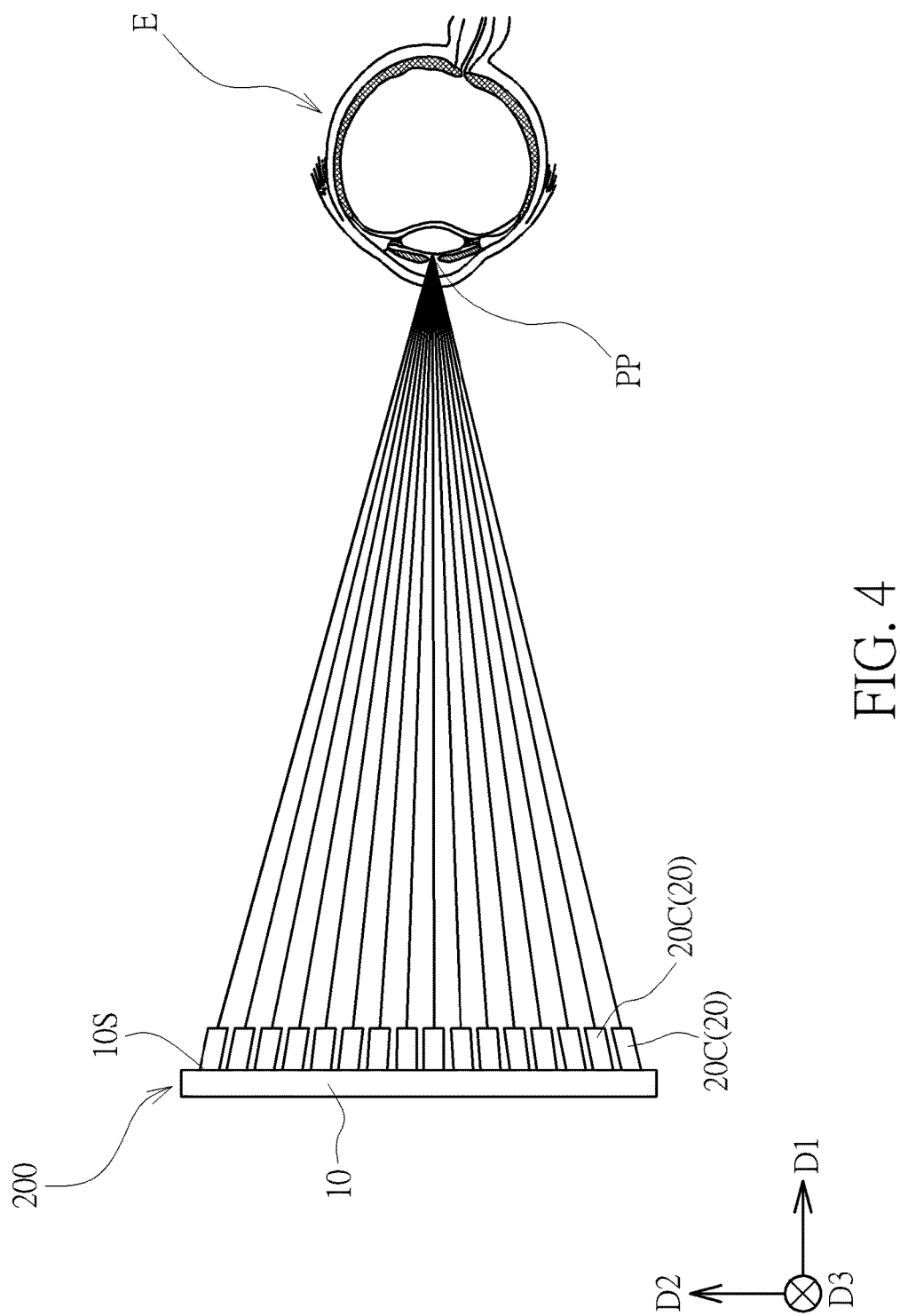
FIG. 4 is a schematic drawing illustrating a near-eye display device according to a second embodiment of the present invention.
Figure 5:
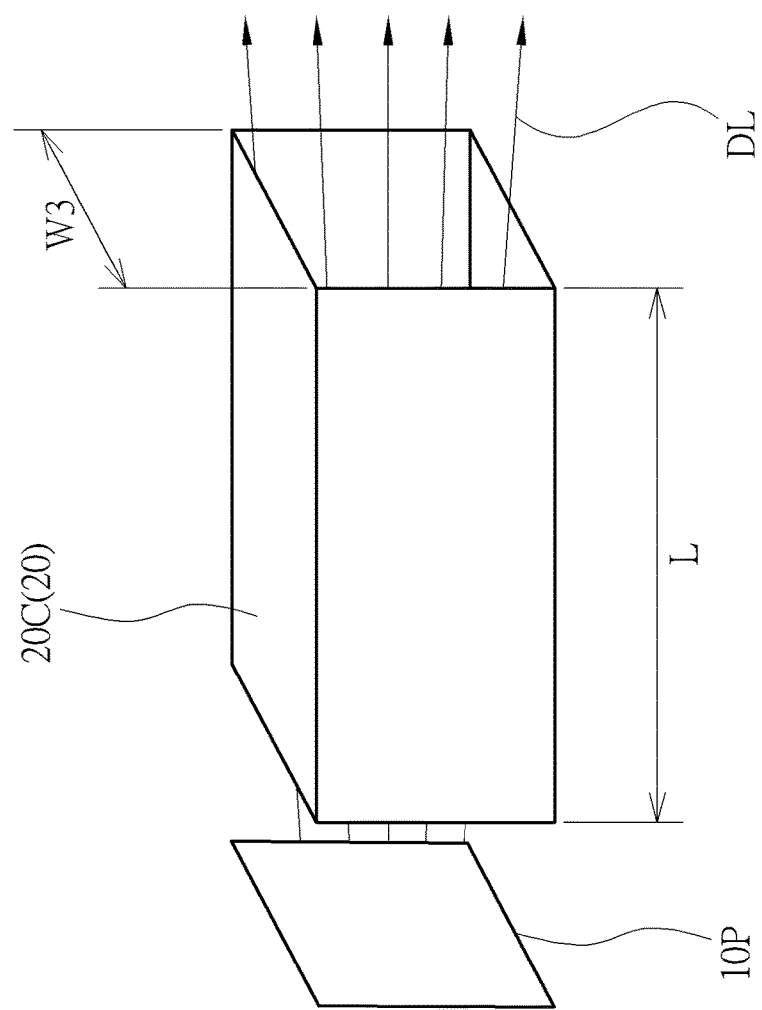
FIG. 5 is a schematic drawing illustrating the display pixel unit and the corresponding light modulation unit of the near-eye display device according to the second embodiment of the present invention.

Please refer to FIG. 4 and FIG. 5. FIG. 4 is a schematic drawing illustrating a near-eye display device according to a second embodiment of the present invention, and FIG. 5 is a schematic drawing illustrating the display pixel unit and the corresponding light modulation unit of the near-eye display device in this embodiment. As shown in FIG. 4 and FIG. 5, the difference between an near-eye display device 200 in this embodiment and the ear-eye display device in the first embodiment described above is that each of the light modulation units 20 in the near-eye display device 200 includes a microlouver 20C configured to constrain an emitting angle of the display light DL directed to the eye E of the user. A width (such as a third width W3 shown in FIG. 5) of each of the microlouvers 20C is smaller than the pupil size of the eye E for constraining the width of the display light DL entering the eye E of the user. Therefore, the third width W3 of each of the microlouvers 20C is smaller than 1.5 mm. In some embodiments, the third width W3 of each of the microlouvers 20C may be smaller than 1 mm, but not limited thereto. In addition, a length L of each of the microlouvers 20C may be larger than the third width W3 of each of the microlouvers 20C for generating the constraining effect to the display light DL. Each of the microlouvers 20C is disposed corresponding to only one of the display pixel units 10P in the first direction D1, and each of the display units 10P is disposed corresponding to only one of the microlouvers 20C in the first direction D1. The emitting angle of the display light DL directed by one of the microlouvers 20C may be different from the emitting angle of the display light DL directed by another one of the microlouvers 20C. In some embodiments, at least two of the microlouvers 20C may direct the display light DL in different directions. For example, an incident direction of the display light DL directed by one of the microlouvers 20C may be different form an incident direction of the display light DL directed by another one of the microlouvers 20C. The incident direction of the display light DL directed by some of the microlouvers 20C may be parallel with the first direction D1, and the incident direction of the display light DL directed by some of the microlouvers 20C may be not parallel with the first direction D1. In other words, an elongation direction of one of the microlouvers 20C may be different form an elongation direction of another one of the microlouvers 20C, and the microlouvers 20C of the near-eye display device 200 are not parallel with one another.

To summarize the above descriptions, in the near-eye display device of the present invention, the display light emitted from each of the display pixel units of the display panel may be directly directed to the eye E of the user, and the user may still receive clear images from the near-eye display device when the user focuses on the wrong distance because the width of the display light directed to the eye is smaller than the pupil size of the eye E and the display light may directly project on the retina of the eye by the pinhole effect. The user does not have to focus on a specific distance for clearly seeing the images generated by the display panel, and the user will not suffer from problems cause by variations of the distance between the user and the near-eye display device the parallax between two eyes of the user. The design of the near-eye display device in the present invention may help to relieve the tension in the eyes of the user using the near-eye display device, and the user experience of the near-eye display device may be enhanced accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A near-eye display device, comprising:
   a display panel comprising a plurality of display pixel units configured to emit display light; and
   a plurality of light modulation units disposed on a light emitting surface of the display panel, wherein each of the light modulation units is disposed corresponding to one of the display pixel units, each of the light modulation units is configured to direct the display light emitted from the corresponding display pixel unit to an eye of a user, and a width of the display light directed to the eye of the user is smaller than the pupil size of the eye, wherein each of the light modulation units comprises:
   a microlens; and
   a light shielding layer having a pinhole disposed between the light emitting surface of the display panel and the microlens, wherein each of the microlenses is disposed corresponding to only one of the display pixel units and only one of the pinholes, and each of the pin holes is smaller than the corresponding microlens.

2. The near-eye display device according to claim 1, wherein the width of the display light directed to the eye of the user is smaller than 1.5 millimeters (mm).

3. The near-eye display device according to claim 1, wherein the display light emitted from each of the display pixel units passes through the corresponding pinhole, and a width of each of the pinholes is smaller than the pupil size of the eye.

4. The near-eye display device according to claim 3, wherein the width of each of the pinholes is smaller than 1.5 mm.

5. The near-eye display device according to claim 3, wherein the width of the display light directed to the eye of the user before entering the eye of the user is larger than the width of each of the pinholes and smaller than the pupil size of the eye.

6. The near-eye display device according to claim 1, wherein an emitting angle of the display light directed by one of the light modulation units is different from an emitting angle of the display light directed by another one of the light modulation units.

7. The near-eye display device according to claim 1, wherein the display panel comprises a liquid crystal display (LCD) panel, an organic light emitting diode (OLED), or a micro-LED display panel.

* * * * *